3,398,073
PHOTOCHEMICAL REACTION PROCESS USING A HALOSILANE-COATED VESSEL
Cyril Geacintov, Scotch Plains, Leon Starr, Plainfield, and William J. Toth, Carteret, N.J., assignors to Mobil Oil Corporation, a corporation of New York
Filed Apr. 13, 1965, Ser. No. 447,627
10 Claims. (Cl. 204—159.13)

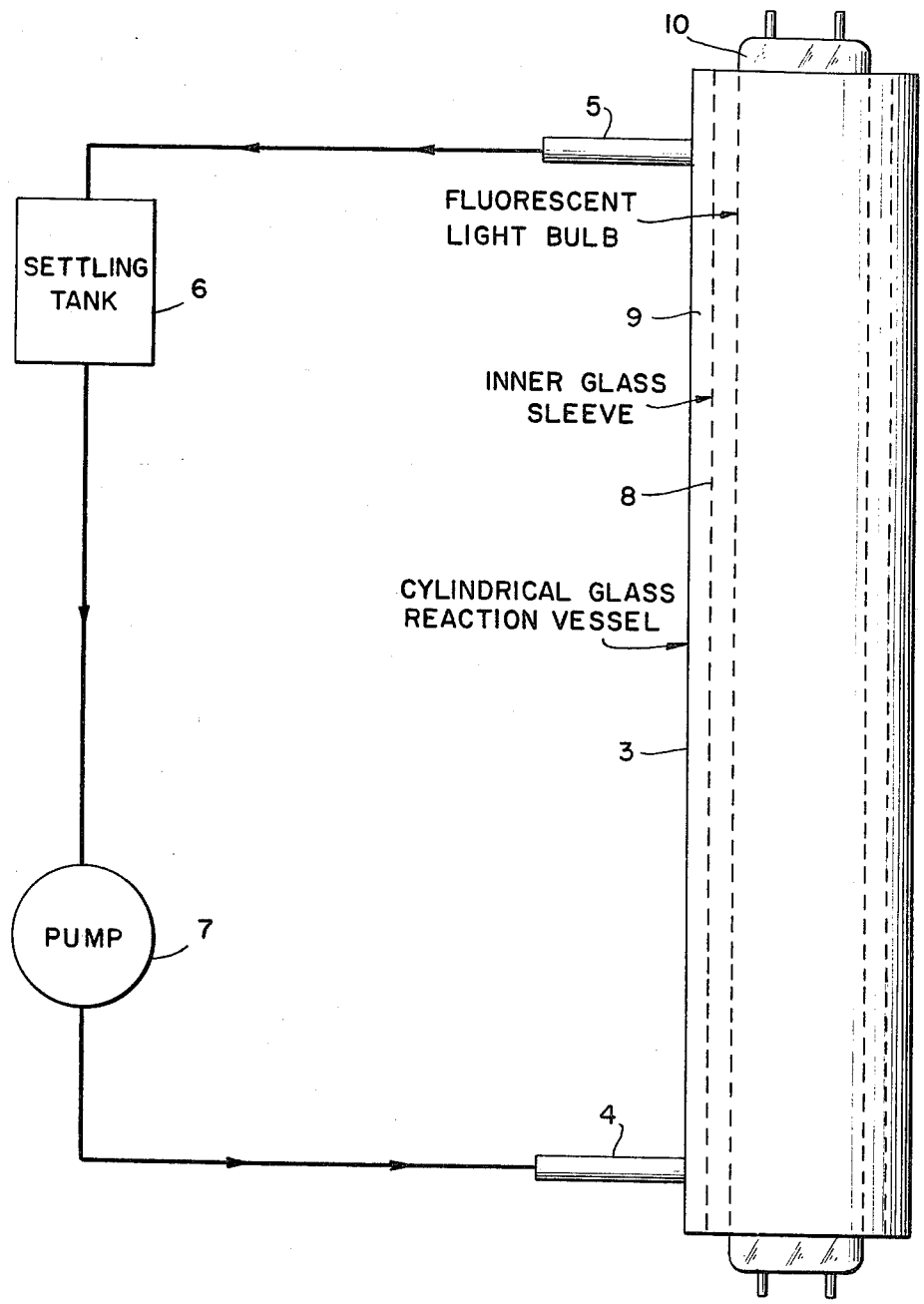

The present invention relates to an improved photochemical reaction process, and more specifically to a photochemical reaction process in which the otherwise-normal formation of an undesirable coating on glass contacted by the reaction mixture is substantially inhibited.

As used in this specification and the appended claims, the term "photochemical reaction" should be understood to mean a reaction which can be affected, e.g. initiated and/or accelerated, by exposure of one or more reactants to light. The light which is useful in such photochemical reactions can be of any type capable of initiating, accelerating and/or otherwise affecting a chemical reaction, but the types generally used are those having a wave length between about 200 and about 760 millimicrons, i.e., a wave length characteristic of the portion of the electromagnetic spectrum which extends from relatively short ultraviolet light waves to the longest visible light waves. Although the wave lengths most advantageously used with a specific photochemical reaction will depend on characteristics of that specific reaction, ultraviolet light is preferred for many photochemical reactions, and ultraviolet light in the portion of the ultraviolet range nearest the visible light range, i.e., light having a wave length between about 300 and about 400 millimicrons, is even more preferred for many of such reactions. If a photosensitizer is used, relatively narrow range of wave lengths may be particularly suitable for use therewith.

As used herein, the term "photochemical reaction process" can mean a batch process in which all of the reaction mixture is exposed to light waves, generally for a desired length of time and often with agitation of the mixture to insure that its contents are uniformly exposed, or it can mean a continuous process in which a stream containing one or more reactants is passed through a reaction zone which is exposed to light waves, in some cases at a flow rate which regulates the residence time of the reactants in the reaction zone to control the length of time during which the reactants are exposed to the light. In either a batch or continuous process, the reactant-containing mixture can be either partially or wholly enclosed within a fluid-tight vessel which is made of glass in at least a portion thereof through which light can be admitted to the mixture from a light source external to the vessel, or the light source can be disposed within the mixture-containing vessel and itself housed within a fluid-tight enclosure which is at least partially constructed of glass to permit passage of light from the enclosed light source to the surrounding reaction mixture. The glass can be of a Pyrex variety, or it can be of any other type which will transmit light having a wave length appropriate for use in a desirable photochemical reaction.

It is well known that in many photochemical reaction processes in which reactants and/or reaction products are in contact with glass, e.g. that through which light is transmitted from a light source to the reaction mixture, a coating normally forms on the contacted glass surface during the course of the process. Such coatings are highly undesirable because they soon block the passage of light to the reaction mixture, thereby slowing or stopping the desired photochemical reaction. In some cases, and especially in processes utilizing a reaction zone of relatively small cross-section, buildup of the coating can also restrict flow of the reaction mixture through the reaction zone.

In the past, it has been customary to cope with this difficulty either by periodically interrupting the reaction process long enough to drain the reaction vessel and remove the undesirable coating from the affected glass surface, which is inconvenient and uneconomical, or, in some cases in which the reaction process is a continuous one, by operating with reaction zone flow rates which are high enough that formation of the coating is partially inhibited but which are often impractically high in view of equipment and/or power requirements.

It has now been discovered that photochemical reactions can be carried out by an improved process in which formation of such undesirable coatings is substantially inhibited without recourse to the heretofore customary but disadvantageous methods for removal or prevention of such coatings. Thus, in a photochemical reaction process in which a reaction mixture is exposed to light emitted from a source which is separated from said mixture by fluid-tight means made of glass in at least a portion thereof through which light can pass from said source to said mixture, in which said mixture comes in contact with the surface of said glass during the course of said process, and in which such contact normally results in the gradual formation of an undesirable coating on said surface of said glass, the present invention comprises carrying out said process with the use of fluid-tight means in which said surface of said glass has been coated, prior to use in said process, with a compound having the formula $R_mSiX_n$, in which each R is selected from the group consisting of alkyl and aryl; each X is a halogen other than fluorine; $m$ is one, two or three; and the sum of $m$ and $n$ is four; and heated to above room temperature.

In a preferred embodiment, the aforedescribed improved process of this invention is carried out with the use of fluid-tight means in which prior to being coated with said compound, said surface has been cleaned of substantially all extraneous matter. By use of the improved process of this invention, formation of the undesirable coatings is in many cases virtually eliminated or at least greatly inhibited, e.g. to the extent that a reaction process in which glass in contact with the reaction mixture would normally be completely coated within five days can now be continued for an exceptionally long period of time, e.g. for up to five weeks or longer, with substantial absence of any coating on the glass contacted by the reaction mixture.

With reference to the aforedescribed compounds having the generic formula $R_mSiX_n$, each R can be the same as or different from each other R when $m$ is two or three, and each X can be the same as or different from each other X when $n$ is two or three. Thus the compounds generically described as $R_mSiX_n$ in the description of the improved process of this invention include alkyltrihalosilanes, aryltrihalosilanes, dialkyldihalosilanes, diaryldihalosilanes, alkylaryldihalosilanes, alkyldiarylhalosilanes, dialkylarylhalosilanes, trialkylhalosilanes and triarylhalosilanes, in which each halogen atom can be chlorine, bromine or iodine. Specific examples of such compounds include methyltrichlorosilane, dimethyldichlorosilane, trimethylchlorosilane, ethyltrichlorosilane, diethyldichlorosilane, triethylchlorosilane, dipropyldichlorosilane, dibutyldichlorosilane, methylethyldichlorosilane, methylpropyldichlorosilane, methylbutyldichlorosilane, ethylpropyldichlorosilane, ethylbutyldichlorosilane, phenyltrichlorosilane, diphenyldichlorosilane, phenyltrichlorosilane, methylphenyldichlorosilane, methyldiphenylchlorosilane, dimethylphenylchlorosilane, ethylphenyldichlorosilane, propylphenyldichlorosilane, methylethylphenylchlorosilane, and any of the foregoing specific examples in which a bromine or iodine atom is substituted for each of one or more of the chlorine atoms in such compounds, e.g. dimethyldibromosilane, diphenyldibromosilane, dimethylbromochlorosilane, diphenylbromochlorosilane, etc.

After being coated with one or more of the aforedescribed compounds, the glass portion of the fluid-tight means useful in the process of this invention is heated to a temperature above room temperature, i.e., above about 20° C. Generally, it is sufficient and convenient to heat the coated glass surface to a temperature in the range extending from above room temperature to about 200° C. The specific temperature and the length of the heating period which are most desirable will depend on which of the aforedescribed compounds is used. For example, heating after coating with dimethyldichlorosilane is preferably carried out between about 90° C. and about 150° C., most conveniently at about 99° C., and generally for a few hours. Application of the compound can be repeated several times, if desired, preferably with the coated glass being wiped free of excess silane between applications, before use of the coated glass in the photochemical reaction process.

In the aforedescribed preferred embodiment of the improved process of the invention, the glass which is to be used in the improved photochemical reaction process of this invention is first thoroughly cleaned of extraneous matter such as dust, oils, lint, etc., for example, with chromic acid, caustic or ammonium bifluoride solution. After being cleaned, it is generally dried, then coated with at least one of the compounds generically described hereinbefore as $R_mSiX_n$ and thereafter baked at a temperature above room temperature for any length of time which is suitable for the specific compound being used.

A specific embodiment of the process of this invention can be carried out as shown in the drawing which is a diagrammatic representation of a continuous process for the photochemical addition of maleic anhydride to benzene, and which is included herein merely as an example of the many types of photochemical reaction processes, both batch and continuous, to which the present invention is applicable.

In the drawing there is shown a continuous photochemical reaction system which includes a hollow cylindrical glass reaction vessel 3 defining an annular channel 9 and having an inlet 4 and an outlet 5 connecting annular channel 9 with a settling tank 6 and a pump 7. A fluid-tight Pyrex glass sleeve 8 running the length of reaction vessel 3 confines the reaction mixture within the annular channel 9, and a fluorescent black light bulb 10 is disposed longitudinally within and spaced from glass sleeve 8. In this embodiment, the shortest distance from glass sleeve 8 to the opposite inner wall surface of reaction vessel 3, i.e., the thickness of the annular channel 9 through which the reaction mixture flows, is about 5 millimeters, and bulb 10 is a GE 40-watt bulb which emits 8.1 watts (about 20% of its power) in the form of ultraviolet light having wave lengths between 320 and 400 millimicrons.

In operation, a liquid reaction mixture containing maleic anhydride and a photosensitizer (e.g. benzophenone) dissolved in benzene is continuously circulated by pump 7 via inlet 4 through annular channel 9 of vessel 3, in which it is exposed at an approximately ambient temperature to continuous irradiation passing from bulb 10 through glass sleeve 8 and into the reaction mixture. The irradiation induces reaction of the benzene and maleic anhydride, resulting in formation of a normally solid benzene-maleic dianhydride adduct which is believed to have the following structural formula:

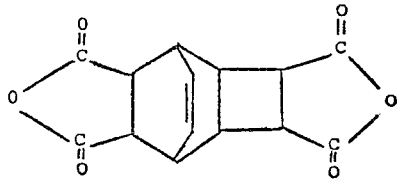

and which is useful in the preparation of thermally stable films. Reaction product is carried along in the reaction mixture as it passes from vessel 3 via outlet 5 to a settling tank 6, in which the product precipitates from the liquid mixture which is then recirculated by pump 7 through reaction vessel 3 for further irradiation.

As the aforedescribed continuous photochemical reaction process has normally been practiced heretofore, and especially after an accumulation of the benzene maleic dianhydride product in the recirculated reaction mixture, a coating would immediately begin to form on the surface of glass sleeve 8 in contact with the reaction mixture passing through annular channel 9, and soon begin to block the passage of light from bulb 10 to the reaction mixture, thereby decreasing the reaction yield. After about three days the reaction process as normally practiced heretofore would be slowed to an extent usually necessitating a shutdown of the process for the purpose of dismantling the apparatus and removing the coating before the process could be continued with an acceptable yield, and after about five days the reaction process would be completely stopped. However, when the aforedescribed exemplary process was carried out in accordance with an embodiment of the improvement described herein i.e., with the use of a glass sleeve 8 which prior to such use was cleaned of extraneous matter, dried, coated on its exterior surface with dimethyldichlorosilane, heated in a forced draft over at 99° C. for three hours, wiped clean, and subjected to a second cycle of such coating and heating the photochemical reaction was continued for over five weeks without formation of any substantial coating on glass sleeve 8, thereby avoiding the need for interruption of the process.

In another specific embodiment of the process of this invention, the aforedescribed reaction of benzene and maleic anhydride was conducted as a batch operation in a five-liter reaction vessel equipped with a stirrer and the light was supplied by a 450-watt high pressure mercury vapor lamp emitting about 48 watts of its power in the form of ultraviolet light having wave lengths between 320 and 400 millimicrons. In this embodiment, the lamp was enclosed within a Pyrex immersion well which was coated on its exterior surface with dimethyldichlorosilane and heated as described hereinbefore prior to its use in the photochemical reaction process, with the result that the exterior surface of the immersion well remained substantially free from coating by the reaction mixture long after reaction in an otherwise-similar process using an uncoated immersion well would have been substantially inhibited by formation of an undesirable coating on the surface of the immersion well in contact with the reaction mixture.

In still other photochemical reactions such as those of o-xylene with maleic anhydride, benzene and chloromaleic anhydride, and cycloaddition of maleic anhydride to itself, the improved process of this invention was likewise found to result in substantial inhibition of the otherwise-normal undesirable coating of glass surfaces contacted by the reaction mixture.

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

1. In a process for the photochemical addition of an anhydride reactant selected from the group consisting of maleic anhydride and chloromaleic anhydride to a hydrocarbon reactant selected from the group consisting of benzene and methyl-substituted benzenes in which a reaction mixture containing said anhydride reactant, said hydrocarbon reactant, and a photosensitizer is exposed to ultraviolet light emitted from a source which is separated from said mixture by fluid-tight means made of glass in at least a portion thereof through which said ultraviolet light passes from said source to said mixture, in which said mixture comes in contact with the surface of said glass in the course of said process, and in which such contact normally results in the gradual formation of an undesirable coating on said surface of said glass, the improvement which comprises carrying out said process with the use of fluid-tight means in which said glass has been coated, prior to use in said process, with a compound having the formula $R_mSiX_n$, in which each R is selected from the group consisting of alkyl and aryl; each X is a halogen other than fluorine; $m$ is one, two or three; and the sum of $m$ and $n$ is four; and heated to above room temperature.

2. A process, as defined in claim 1, in which X is chlorine.

3. A process, as defined in claim 1, in which $m$ is 2.

4. A process, as defined in claim 1, in which said compound is dimethyldichlorosilane.

5. A process, as defined in claim 1, in which said compound is diphenyldichlorosilane.

6. A process, as defined in claim 2, further characterized in that, prior to being coated with said compound, said surface is cleaned of substantially all extraneous matter.

7. A process, as defined in claim 6, in which said surface is cleaned with chromic acid.

8. A process, as defined in claim 6, in which said surface is cleaned with caustic.

9. A process, as defined in claim 6, in which said surface is cleaned with a solution containing ammonium bifluoride.

10. A process, as defined in claim 1, in which said anhydride reactant is maleic anhydride and said hydrocarbon reactant is benzene.

References Cited

Bryce-Smith et al., Addition of Maleic Anhydride to Phenanthrene, Chemistry and Industry, Apr. 8, 1961, p. 429.

MURRAY TILLMAN, *Primary Examiner.*

R. TURER, *Assistant Examiner.*